United States Patent [19]

Pruitt

[11] Patent Number: 5,788,319

[45] Date of Patent: Aug. 4, 1998

[54] CAMPING UNIT FOR PICK-UP TRUCKS, VANS, BOATS AND THE LIKE

[76] Inventor: Ken Pruitt, P.O. Box 112585, Anchorage, Ak. 99511

[21] Appl. No.: 611,817

[22] Filed: Mar. 6, 1996

[51] Int. Cl.⁶ .................................................. B60P 3/345
[52] U.S. Cl. .................... 296/164; 296/164; 296/170; 296/171; 296/173; 296/175
[58] Field of Search ...................... 256/26, 27, 156, 256/159, 160, 164, 165, 168, 170, 171, 173, 175; 135/88.01, 88.05, 88.1, 88.13, 88.16, 88.17, 88.18

[56] References Cited

U.S. PATENT DOCUMENTS

| | | | |
|---|---|---|---|
| 3,145,046 | 8/1964 | Orn et al. | 296/165 X |
| 3,309,132 | 3/1967 | Kimes | 296/164 |
| 3,466,083 | 9/1969 | Owen | 135/88.13 |

Primary Examiner—Sherman Basinger
Attorney, Agent, or Firm—Michael J. Tavella

[57] ABSTRACT

A fold down-expandable camper shell that collapses to a very small unit for storage. The collapsed unit is only slightly larger than a standard pick-up camper shell, auto top or boat cabin, yet when open, the camper body has normal standing headroom. The unit has a push out queen size bed that is set up above the cab, leaving the living area completely open. An air mattress and bedding, that are normally carried on the bed frame can be extended and filled, ready to use. Extension bars, that are joined by cables, can extend outward on both sides of the vehicle, to create an area for bunk beds or storage shelves while cooking, etc. A soft canvas type covering is attached to the unit so that it is sealed and protected from the elements. Windows and screens can be added for viewing and for airflow as desired.

20 Claims, 15 Drawing Sheets

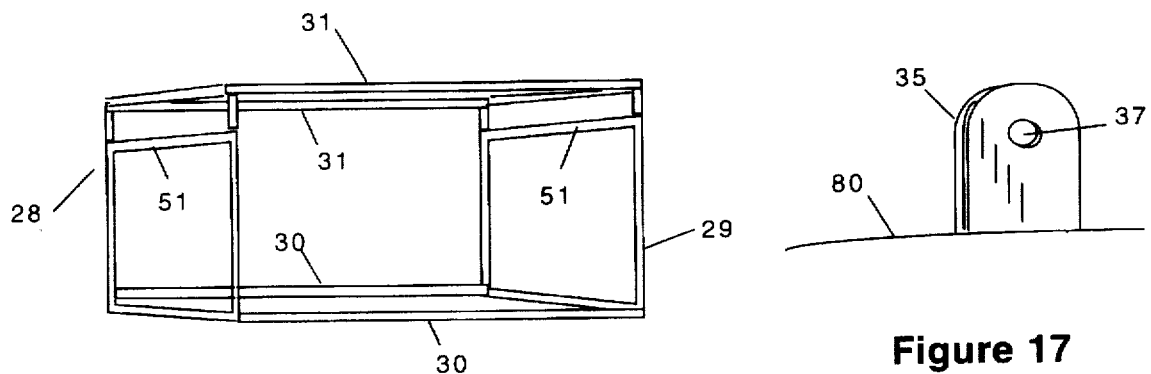
Figure 15
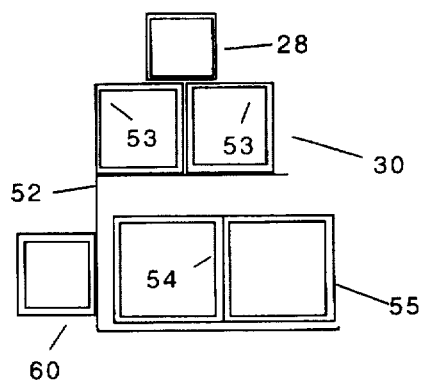
Figure 16
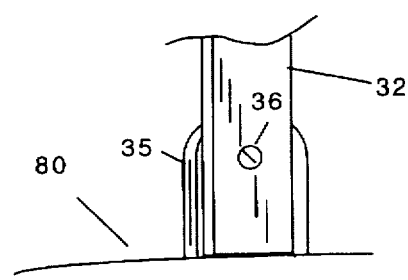
Figure 17
Figure 18

CAMPING UNIT FOR PICK-UP TRUCKS, VANS, BOATS AND THE LIKE

This invention relates to camping units for many types of vehicles and boats and particularly to camping units for pick-up trucks with sleeping areas that extend forward over the cab of a vehicle and vans with top conversions.

BACKGROUND OF THE INVENTION

People have been seeking to turn vehicles into camper units for many years. These efforts range from the large class A type motor homes to smaller units built into vans and other light trucks. Many devices to convert pick-up trucks or vans into camper units have been developed. These units fall into three main categories. The first two cover modifications to vans and pick-up trucks. The third category covers modifications to trailers and motor homes.

By far the largest group is the van conversion. In this group, a van type truck is fitted with a lift up type "pop up" roof. This roof can extend vertically or can be opened at an angle. Those roofs that open at angles often have fold up tents attached that cover the open area under the roof. A portable bed is supplied in these units that can be opened and used once the top is opened. In some cases, tents are attached to the van to expand the size of the enclosed living space. Examples of these types of designs are found in U.S. Pat. Nos. 3,019,455, 3,659,893, 4,077,662, 4,055,366, 4,251,102, 4,462,631, 4,548,438, 4,653,800, 4,973,101, and 4,930,837.

The second type of design involves pick-up trucks. Most often, the designs center around a hard shell cover that fits over the pick-up truck bed. The most complex of these designs is the pick-up camper that is a self contained living unit that has full kitchen and bed facilities. These units are large, heavy, and expensive. A less expensive alternative is a portable tent that can fit over the open end of a camper shell. This provides a covered entry to the back of the pick-up and, depending on the model, several square feet of normal-headroom living space. Camper shells can be modified to adopt to larger camper type units. Examples of such designs are found in U.S. Pat. Nos. 3,061,358, 3,447,830, 3,659,894, 4,542,932, 5,083,833, and 5,050,927. The last patent is for a slide out room for a typical motor home, rather than a camper for a pick-up truck.

The third group of camping type vehicles is the portable pop up style camp trailer. This is a trailer that folds down to a compact unit for traveling. At the campsite, the trailer "pops up," providing living space. Beds extend out from the ends of the unit, out of the way of the living space. The beds are typically covered with tent materials, as are the sides of the unit. An example of this design is found in U.S. Pat. No. 3,514,148.

All of these designs, except for U.S. Pat. No. 3,659,893, to Steele, teach some type of pop up camper that extends out of the side of the vehicle, or pops up the top. The Steele design is a variation of this concept. The Steele patent adopts the "pop-up" style trailer design mentioned above into a van type vehicle. In this design, the roof of the van is the pop-up camper. To use the camper, the roof is raised and the two end portions are extended. Once extended, the two end portions are supported by pipe braces. A tent cover, much like that in the pop up campers is used to cover the end pull outs. Once opened, the interior of the van has sufficient headroom to allow adults to stand comfortably. Despite this convenience, the extension units must be externally supported. Moreover, the unit must be fitted to the van either as an original equipment camper vehicle, or a very expensive retrofit on an existing van.

Despite the advantages that all the above designs bring to the camper field, they all have one of two problems: either they are big, heavy and bulky-such as the standard camper units that fit into pick-up truck beds, or they require significant modifications to the vehicle that make them expensive or difficult to operate and use. Moreover, the smaller van and truck campers do not have a large sleeping area that is separate from the living space. This means that the bed is often only slightly larger than a twin bed and is opened in the living space, making movement around the inside of the truck or van inconvenient.

SUMMARY OF THE INVENTION

The present invention overcomes these difficulties. The invention is a fold down camper shell or top that collapses to a very small unit for storage. The collapsed unit is only slightly higher than a standard pick-up camper shell top-it protrudes less than 12 inches above the original roof line of a typical vehicle. When open, the camper body has normal standing headroom. Also, the unit has a push out queen size bed that is set up above the cab, leaving the living area completely open.

To use the invention with a pick-up type truck, the pick-up tailgate and the rear window of the camper shell are opened (on other vehicles, a back hatch or similar type door is opened). The rear wall of the camper unit is then raised. The bed is then slid forward and the front wall of the camper is raised. The front and back walls are then securely locked. The bed, when extended, is supported by vertical supports that attach to the cab of the vehicle, near the windshield. These braces make the camper unit extremely stable. Once braced, the bed unit has two side wings and a front wing that extend outwardly, thereby opening to a full queen sized bed. An air mattress and bedding, that are normally carried on the bed frame can be extended and filled, ready to use. Arm extensions, that are joined by cables, can extend outward on both sides of the unit, to create an area for bunk beds or storage shelves to use while cooking.

The camper frame is made of steel tubing. Hinges, slides and other hardware components allow the unit to fold and unfold. A soft water proof fabric type covering is attached to the unit so that it is sealed and protected from the elements. Windows and screens can be added for viewing and for airflow as desired.

It is an object of this invention to create a fold down camper unit for vehicles and boats that has an extendible bed that can open to queen size and can be collapsed to fit within a pick-up truck bed.

It is an object of this invention to create a fold down camper unit for vehicles and boats that holds a mattress and all associated bedding when the unit is collapsed for storage.

It is another object of this invention to create a fold down camper unit for vehicles and boats that opens to full standing headroom.

It is yet another object of this invention to create a fold down camper unit for vehicles and boats where the fold down camper shell top collapses to a compact size that fits the top contours of vehicles and boats.

It is another object of this invention to create a fold down camper unit for vehicles and boats where the camper bed extends forward over the cab or cabin out of the way of the camper's main use area.

3

Figure 2:
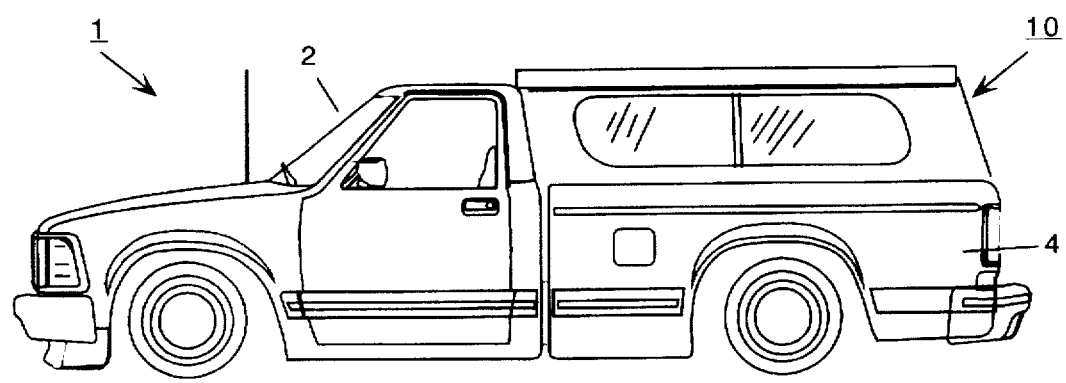

FIG. 2 is a side view of a pick-up truck with the invention installed and closed.

Figure 3:
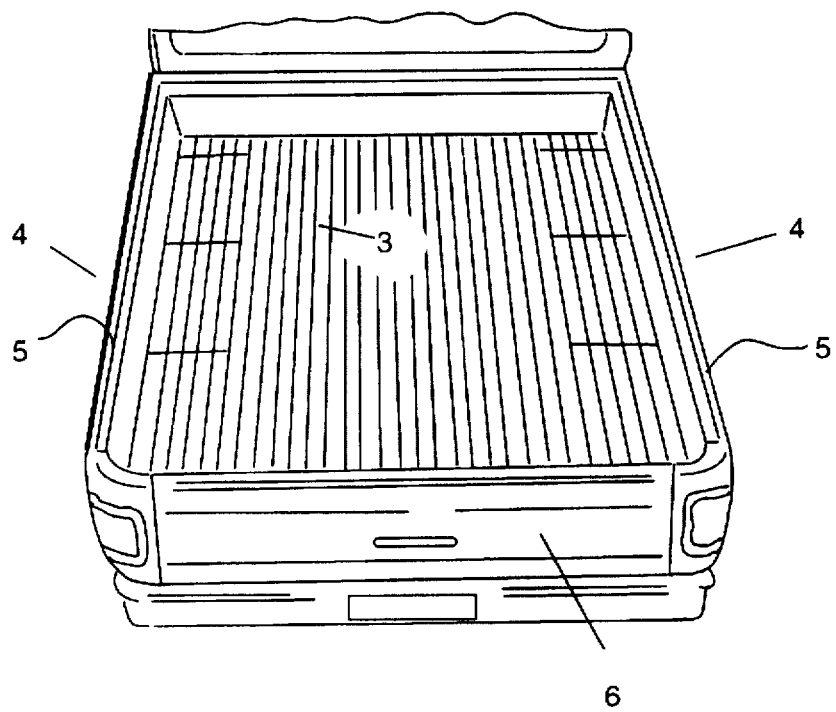

FIG. 3 is a rear view of a typical pick-up truck bed without the invention.

Figure 4:
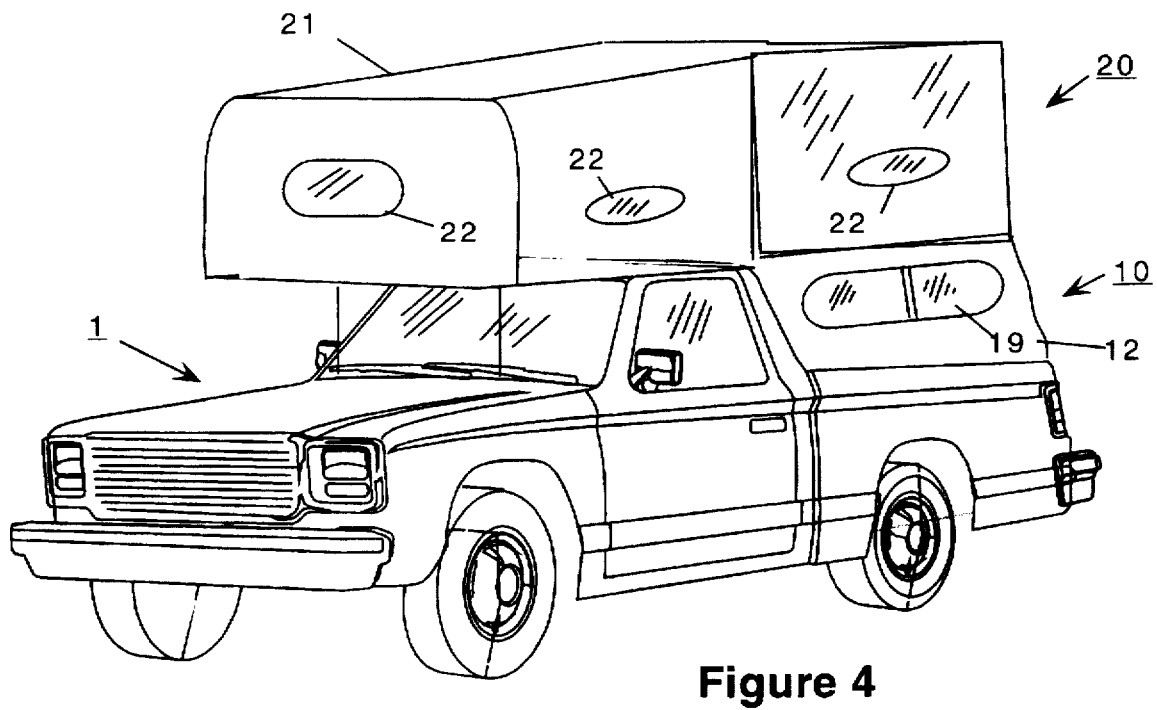

FIG. 4 is a perspective view of a pick-up truck with the invention installed and open.

Figure 5:
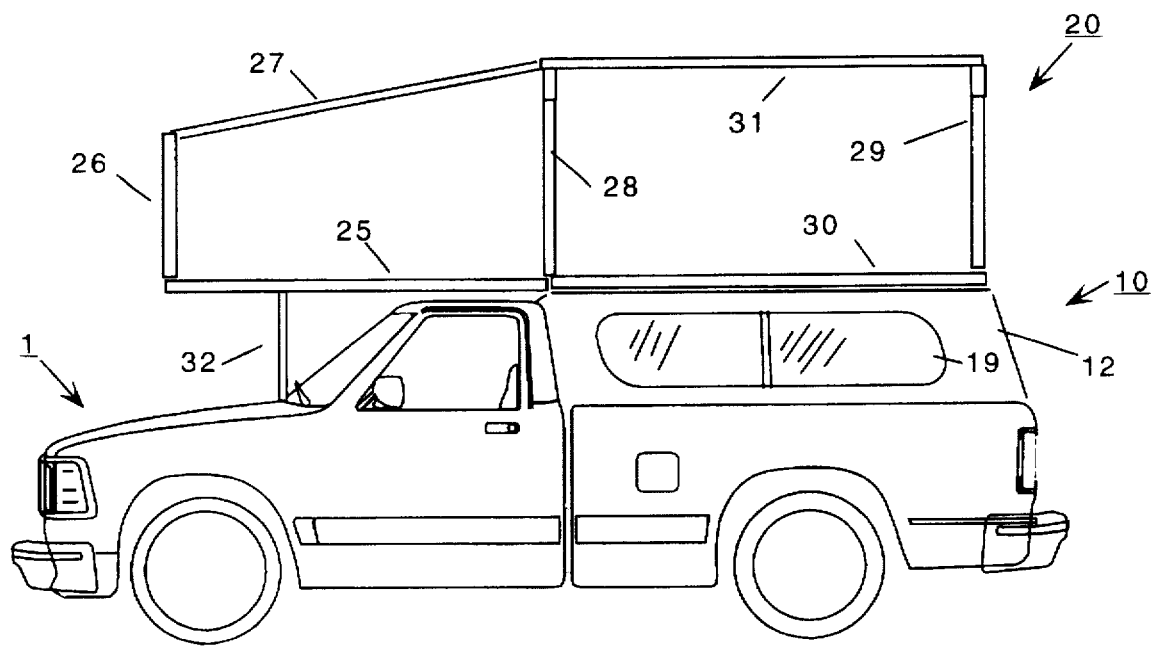

FIG. 5 is a side view of a pick-up truck with the invention installed and open, with the cover removed.

Figure 6:
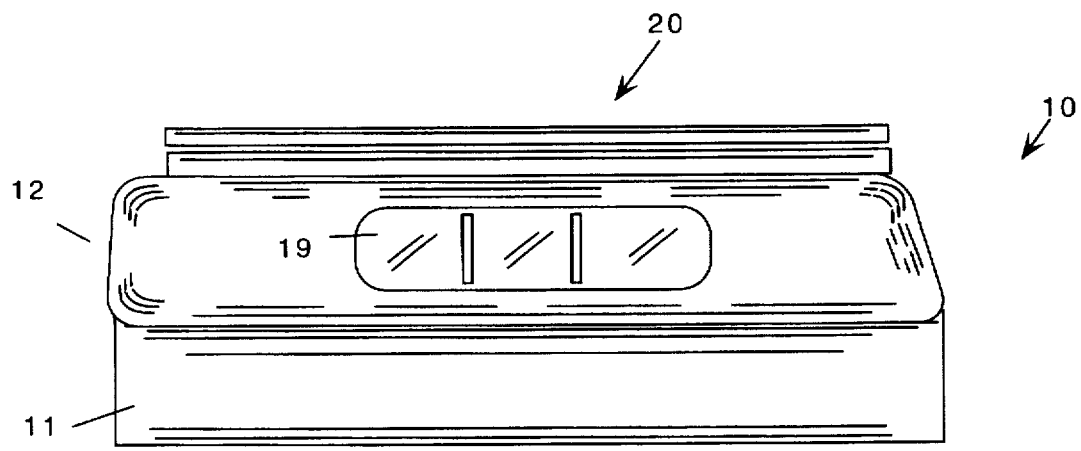

FIG. 6 is a side view of the invention, closed, viewed out of the bed of the pick-up truck.

Figure 7:
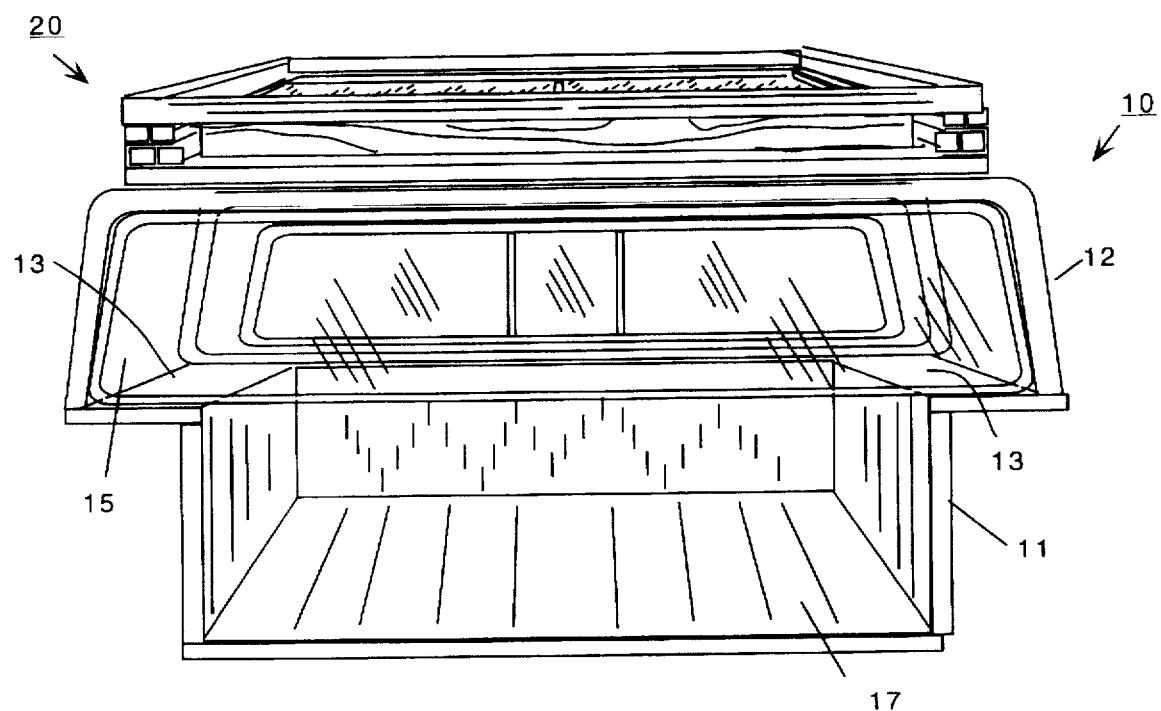

FIG. 7 is a rear view of the invention, closed, viewed out of the bed of the pick-up truck.

Figure 8:
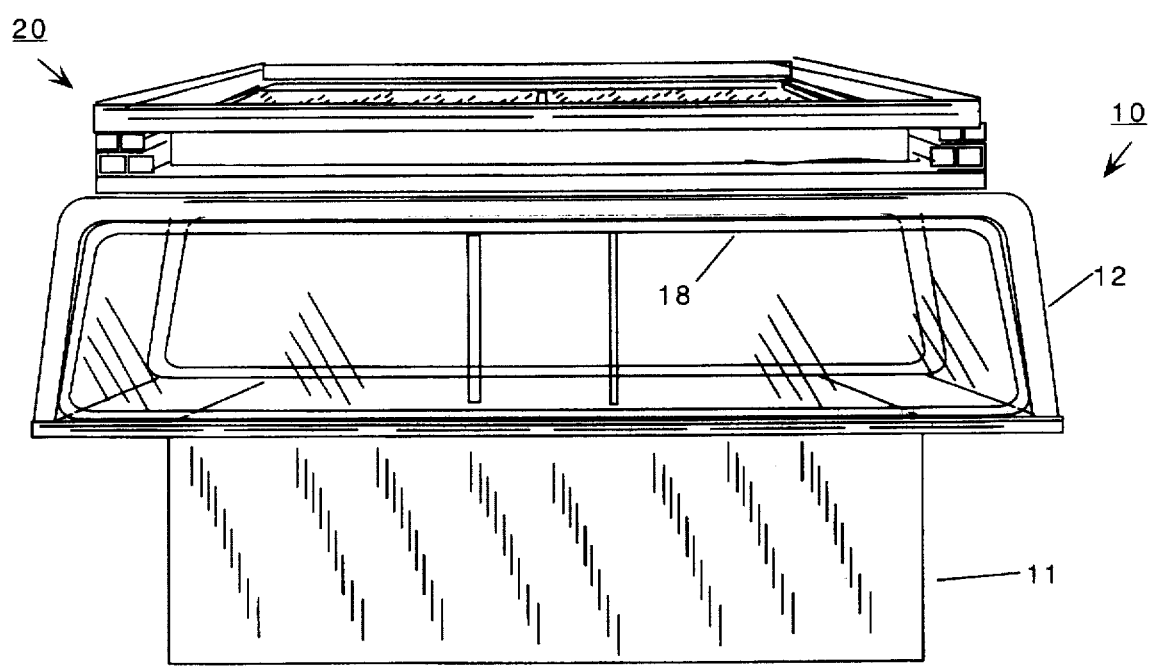

FIG. 8 is a front view of the invention, closed, viewed out of the bed of the pick-up truck.

Figure 9:
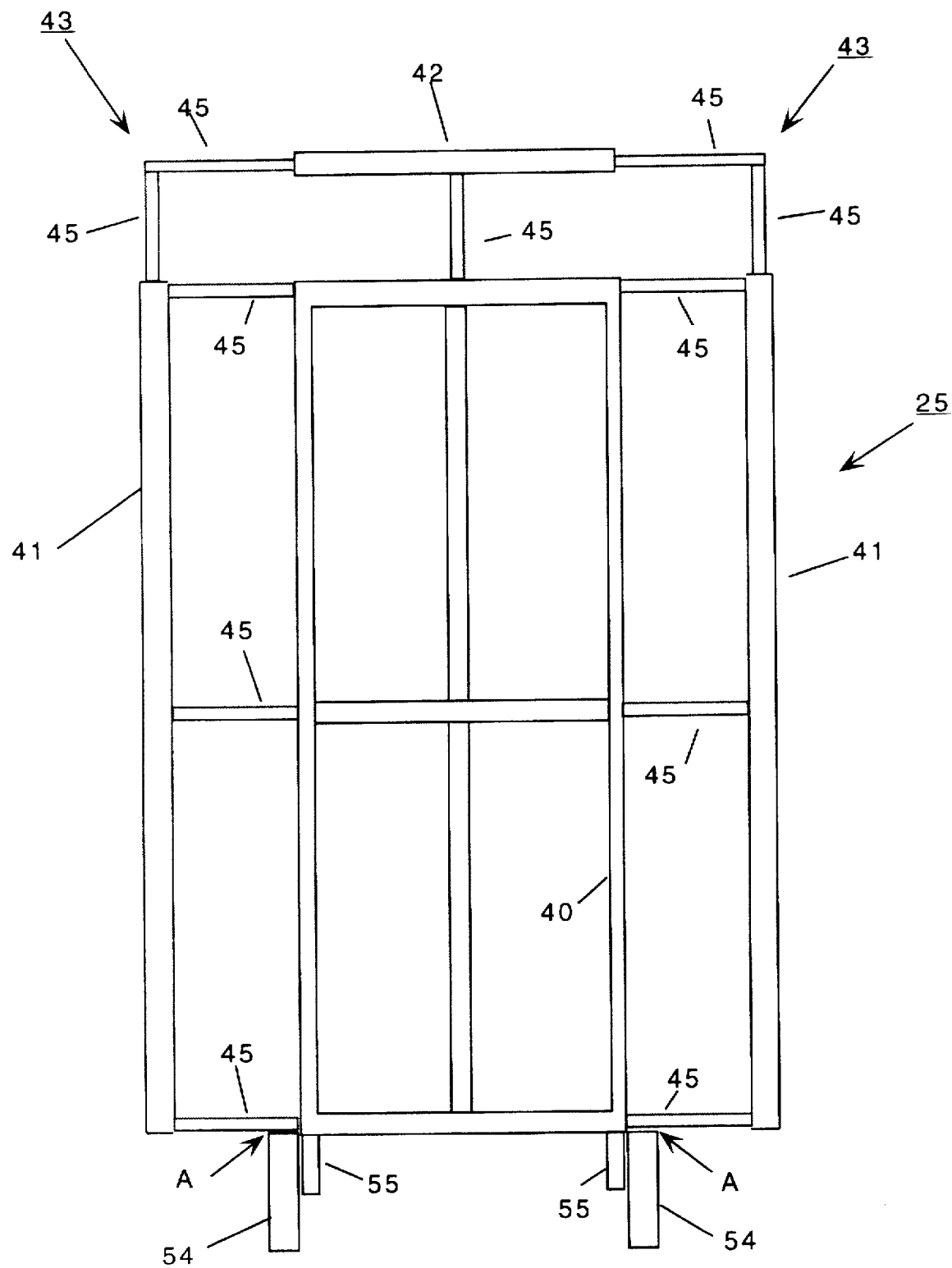

FIG. 9 is a top view of the bed unit fully opened.

Figure 10:
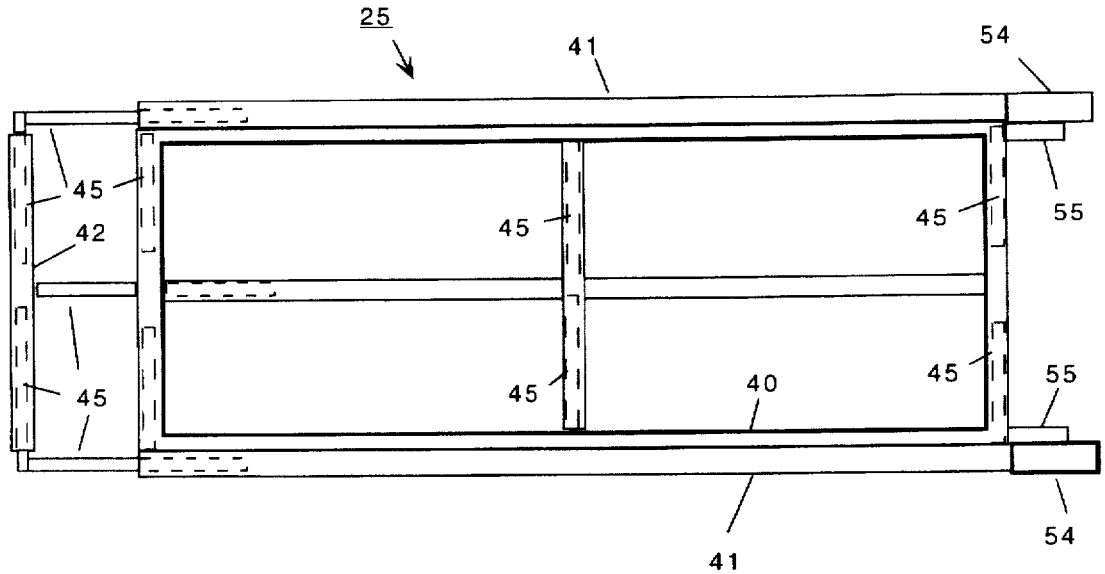

FIG. 10 is a top view of the bed unit with the side pullouts stored.

Figure 11:
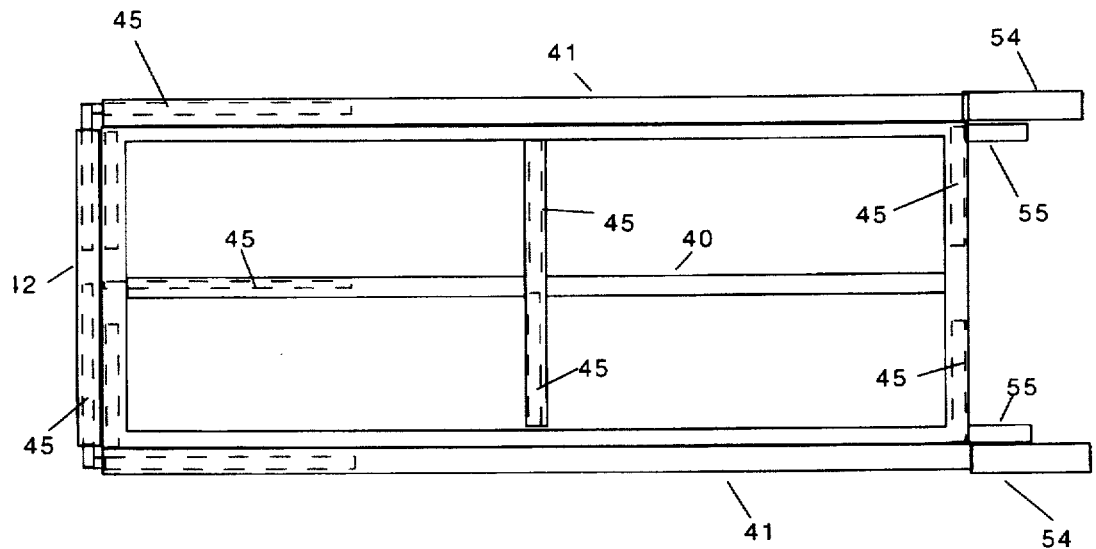

FIG. 11 is a top view of the bed unit with the front wing stored.

Figure 12:
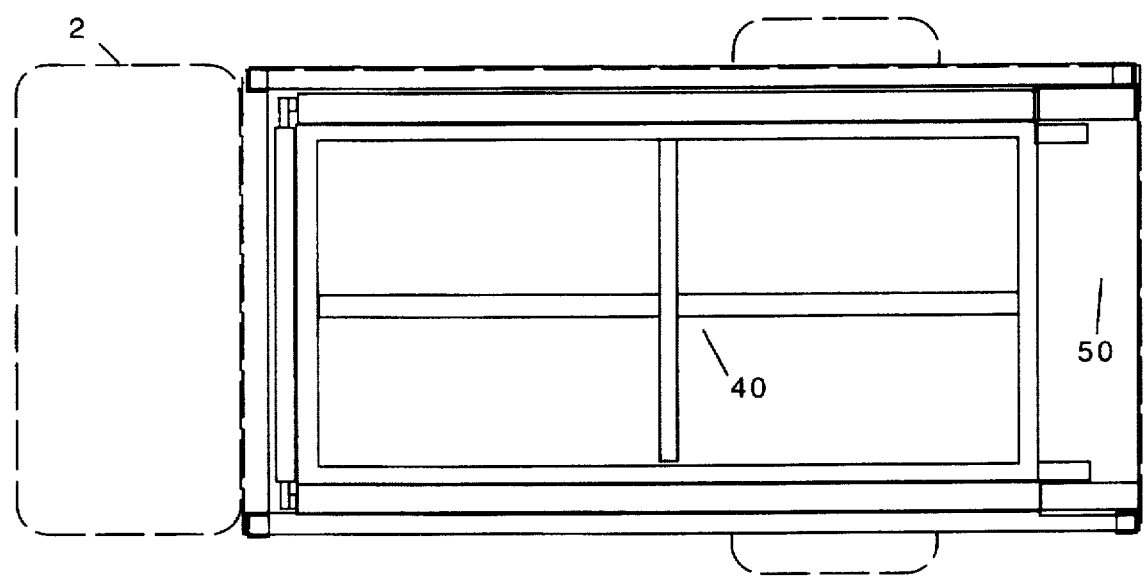

FIG. 12 is a top view of a pick-up truck bed showing the bed unit with the front wing stored, within the pick-up truck bed.

Figure 13:
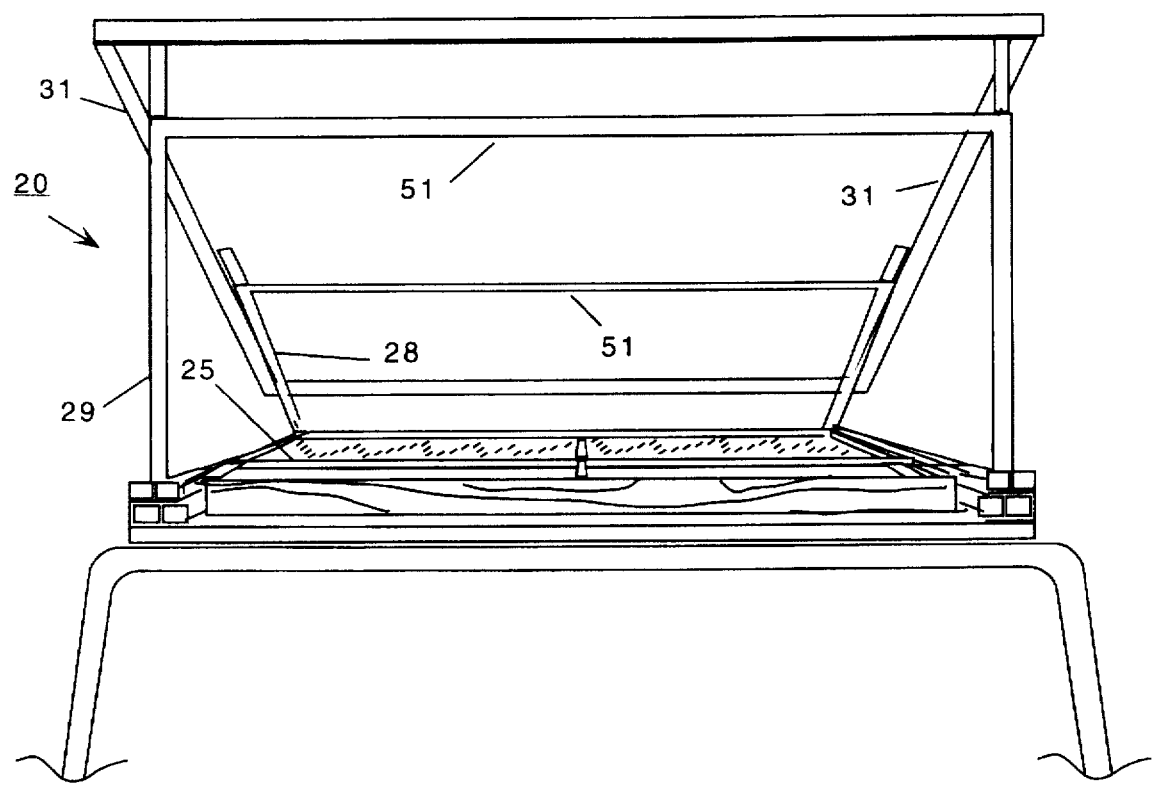

FIG. 13 is a rear view of the invention with the rear posts deployed and the bed stored.

Figure 14:
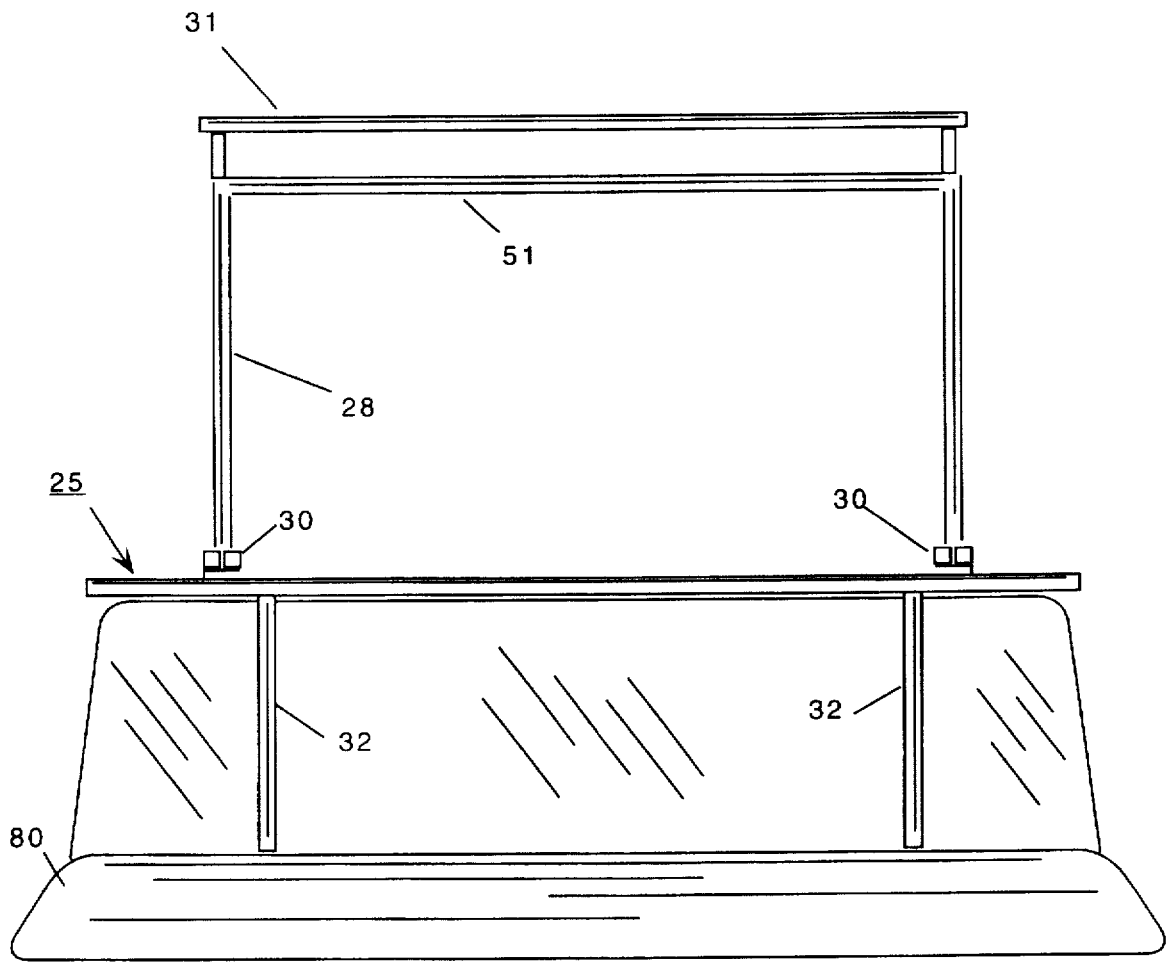

FIG. 14 is a front detail view of the invention opened with the cover removed and the bed deployed.

FIG. 15 is a perspective view of the upper box of the invention opened and the cover removed.

FIG. 16 is a detail view of the side rail construction showing the side extensions in a stored position.

FIG. 17 is a detail view of a hood clip.

FIG. 18 is a detail view of a hood clip with a bed support post installed.

Figure 19:
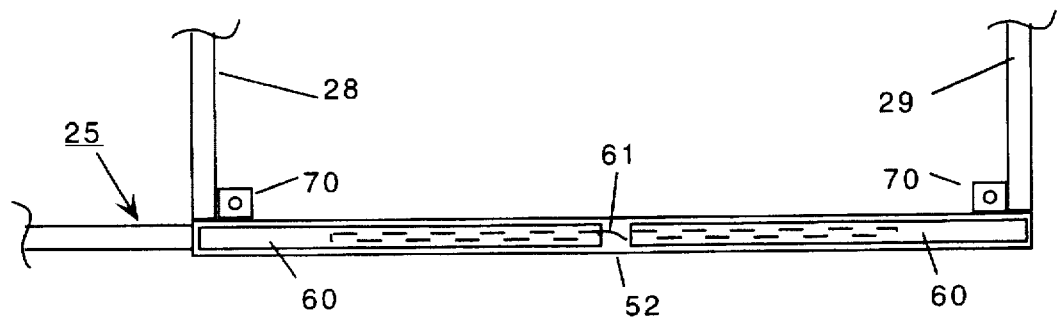

FIG. 19 is a top view of one pair of side extensions, folded for storage.

Figure 20:
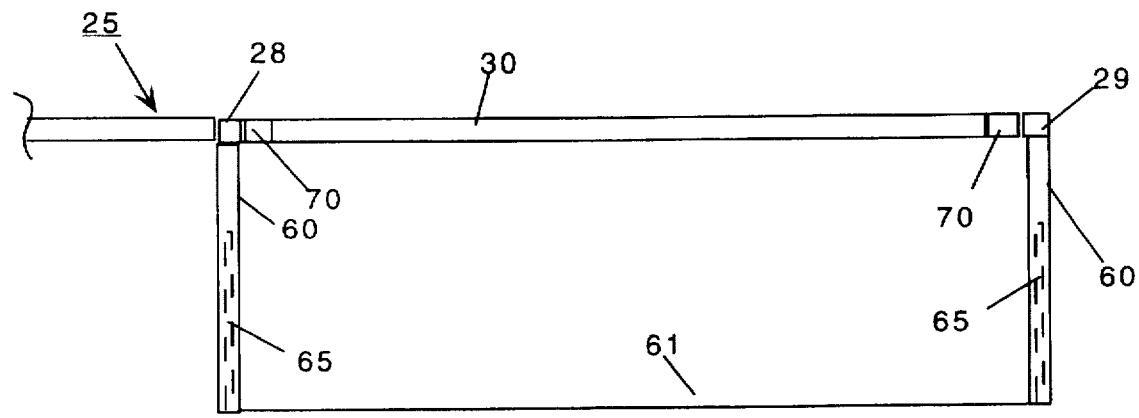

FIG. 20 is a top view of one pair of side extensions deployed in the first stage.

Figure 21:
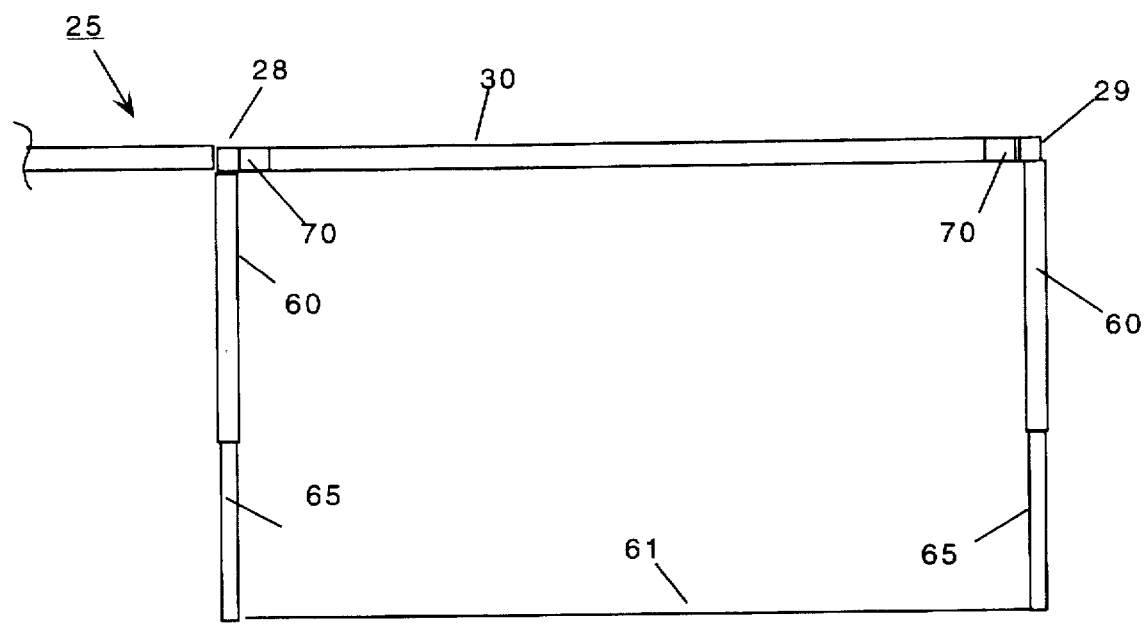

FIG. 21 is a top view of one pair of side extensions fully deployed.

Figure 22:
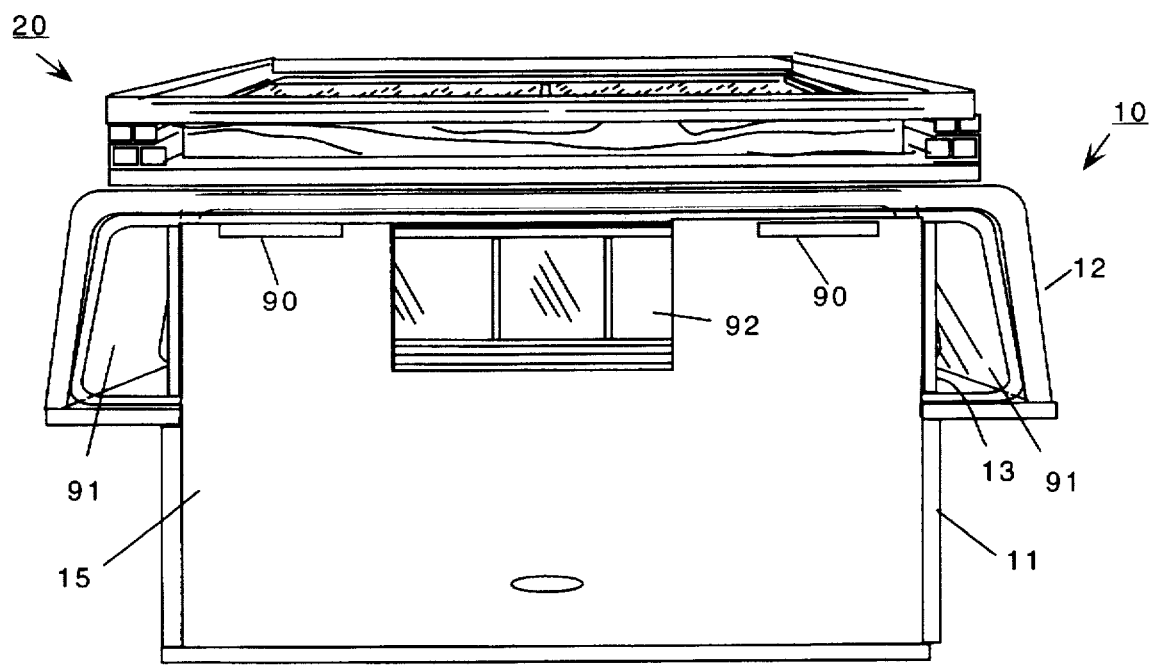

FIG. 22 is a rear view of the invention, closed, viewed out of the bed of the pick-up truck with a full rear door panel instead of a tail gate.

Figure 23A:
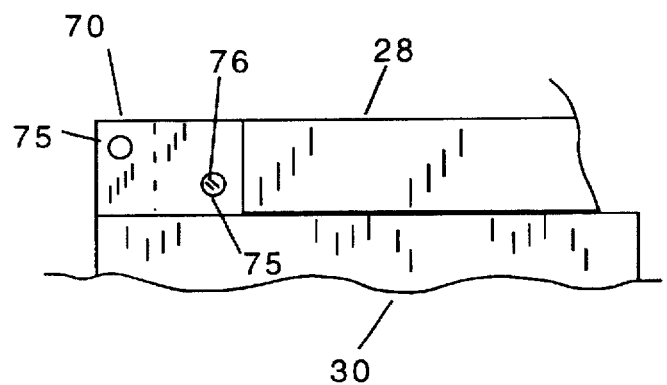

FIG. 23a is a detail view of a support hinge with a support arm in a collapsed position.

Figure 23B:
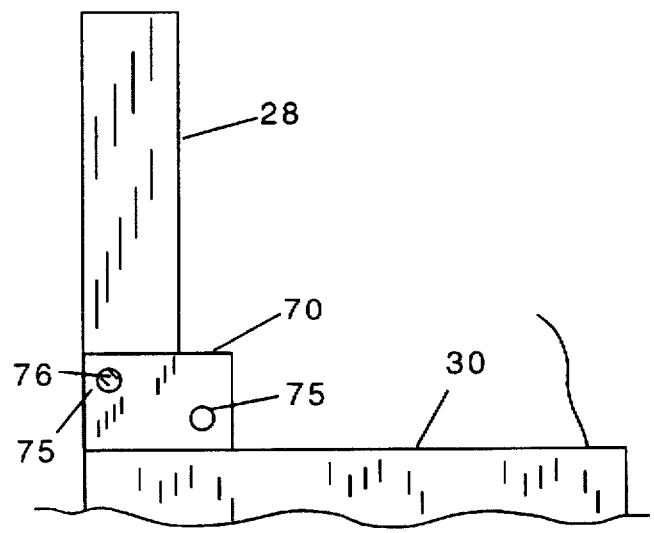

FIG. 23b is a detail view of a support hinge with a support arm in a raised position.

DETAILED DESCRIPTION OF THE INVENTION

Although the device can be fitted on vans, sport utility vehicles, station wagons or boats, the description of the invention below focuses on the design as mounted in a pick-up truck. Details of modifications for other vehicles are provided as needed.

Figure 1:
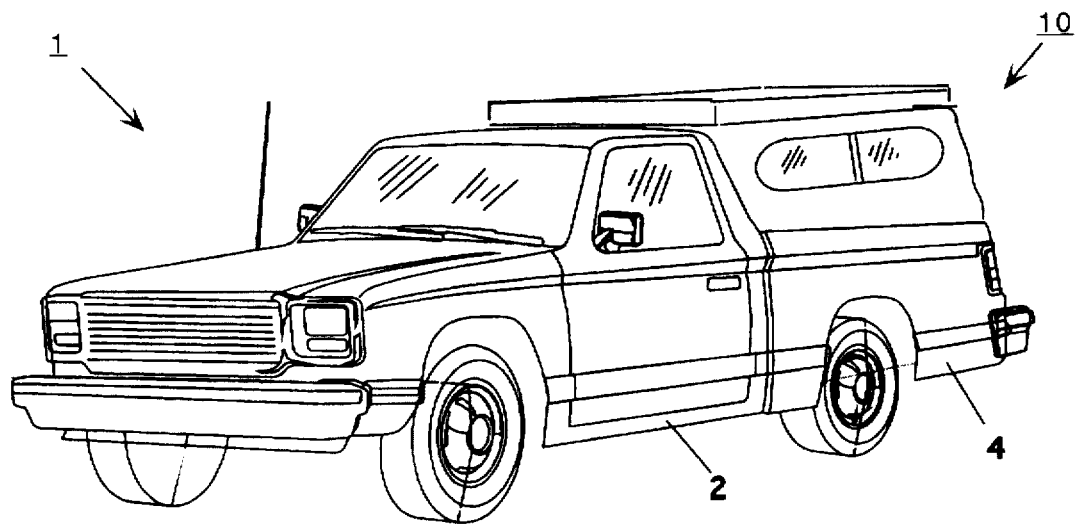
FIG. 1 is a perspective view of a pick-up truck with the invention installed and closed.

Referring now to FIGS. 1, 2, and 3, a typical pick-up style truck 1 is shown. This style of truck has an enclosed cab 2, an open bed 3 (see, e.g., FIG. 3) and a tail gate 6. The bed 3 has side walls 4 as shown. The side walls 4 have tops that form flat support rails 5. The invention 10 is designed to fit within the bed 3 of the pick-up truck 1. FIG. 3 also shows a rear view of the effective standing area within the truck bed 3. Moreover, it also represents the area behind the front seats if a van or a sport-utility vehicle. Such a view is shown with the rear seats either folded for storage or removed from the vehicle.

FIG. 4 shows the upper unit 20 in its fully open arrangement, with the outer covering 21 in place. In the preferred embodiment, the outer covering 21 is a waterproof material, such as canvas or similar materials. The top portion of the outer covering 21 is coated to be waterproof. Windows 22 can be installed in the outer covering 21 in the manner common to the art.

FIG. 5 is a side view of the invention 10 installed in a pick-up truck 1 with the outer covering 21 removed and the upper unit 20 fully opened. The major components shown are the expandable bed frame 25, a front support 26, the bed cover support 27, the box front support 28, the box back support 29, the bottom frame 30 and the top frame 31. Two (see, e.g., FIG. 14) bed support posts 32 are provided to support the bed frame 25. The bed support posts 32 are attached to bed support brackets 35, attached to the hood of the pick-up truck 1 see FIGS. 17 and 18. Pins 36 are used to secure the bed support posts 32 to the support brackets 35, through holes 37 formed in the support brackets 35 as shown.

Note that for boats, only the upper unit 20 is used. This upper unit 20 is fitted to the top of a boat cabin in a similar manner as that for the lower unit 11 for the pick-up truck 1. Once installed in a boat, the upper unit 20 operates in the manner as that for the pick-up, as discussed below.

Referring now to FIGS. 6, 7, and 8, the invention is shown out of the truck bed 3. FIG. 6 is a side view of the invention 10 showing the lower unit 11 and the middle unit 12. Here, a side window 19 is shown. A second window can be installed on the other side of the middle unit 12, if desired. The lower unit 11 and middle unit 12 are typically formed as one unit, which may be made of steel, aluminum or fiberglass using techniques common to the art.

FIG. 7 is a rear view of the invention 10. Here, a lower unit 11 is shown. The lower unit 11 is designed to fit within the side walls 4 of the pick-up truck 1. The middle unit 12 sits above the lower unit 11 and is attached to the lower unit 11. The middle unit 12 and lower unit 11 can be formed as one piece. They are described separately here for convenience. The middle unit 12 is wider that the lower unit 11. The extensions 13 are designed to sit on and extend over the flat support rails 5 of the pick-up truck 1. FIG. 4 shows the rear access hatch 15. This hatch is hinged to open upwards for access to the interior of the invention. The lower unit 11 has no back wall when the tail gate 6 is used. When the tail gate 6 is removed, the lower unit 11 can have a covering that can be an extension of the rear access hatch 15 or a separate door. See, e.g., FIG. 22. The middle unit 12 has flat areas 13 that can be used as storage shelves, if desired. A floor 17 may be installed if desired. Otherwise, the truck bed 3 can be used as the floor of the unit.

FIG. 8 shows the front view of the invention 10. Here, a window unit 18 is installed in the front portion of the middle unit 12. This window unit 18 is an ordinary window of the type normally found on pick-up trucks and other recreational vehicles.

FIGS. 6, 7 and 8, show the upper unit 20 in a collapsed or stored state. When collapsed for storage, the upper unit 20 folds down to a compact unit for traveling. FIGS. 1 and 2 show the invention 10 with the upper unit 20 in the stored state.

FIG. 9 is a top view of the expandable bed frame 25 in the fully expanded position. This expandable bed frame 25 is unique in that it can be extended and collapsed, as discussed below, while keeping all of the members in the same plane. As a result, the expandable bed frame 25 has the same thickness when stored as it has when expanded. This saves space, and more importantly, it allows the unit 10 to fold down into a very compact space, while keeping the bedding in place. The expandable bed frame 25 has six main parts. First, a central frame member 40 forms the main part of the frame. Two side members 41 extend from the central frame member 40 as shown. At the outer end of the central frame member 40 is the head member 42. This member has two wing members 43 that extend from the head member 42 in the same manner as those of the side members 41. All the members 40, 41, and 42, are formed of 1.25 inch tubing in the preferred embodiment. The members 40, 41, and 42 are connected by extension pieces 45 as shown. The extension pieces 45 are made from 1 inch tubing in the preferred embodiment. The extension pieces slide into the members 40, 41, and 42 so that they can extend from, or contract into, the members 40, 41, and 42. To expand the expandable bed frame 25, the expandable bed frame 25 if pushed fully forward. The bed support posts 32 are installed as described below. The right and left side members 41 are then pulled out and locked into place using spring type push pins, common to the art, or any other similar fastener. Finally, the head member 42 is extended and locked into place.

FIG. 10 shows the side members 41 stored within the central frame member 40. The wing members 43 are automatically retracted when the side members 41 are retracted. FIG. 11 shows the head member 42 stored in the central frame member 40. This member is stored by pushing the head member 42 up against the central frame member 40. Finally, FIG. 12 shows the collapses expandable bed frame 25 in its stored position within the truck bed 3. Note the area 50 of the truck bed 3 behind the expandable bed frame 25 is designed to be left empty to allow access to the inside of the unit 10 for deployment, as discussed below.

FIG. 13 shows the rear of the upper unit 20 being opened, or the just before the unit 20 is fully collapsed. To open the unit 10, the user opens the rear access hatch 15 and enters the rear portion 50 of the unit. The user then raises the box back frame 29. At this point, the user can stand erect in the rear portion 50 of the unit 10. The expandable bed frame 25 is in front of the user (see also FIG. 12). The user can then push the expandable bed frame 25 forward until it is fully extended forward of the box. Details of how the expandable bed frame 25 moves within the rear of the unit 10 are discussed below. The user can then raise the box front frame 28. Next, the user can install the bed support posts 32 to support the expandable bed frame 25. Once the bed support posts 32 are installed, as discussed below, the expandable bed frame 25 can be opened by pulling the side members 41, the head member 42 that are stored within the central frame member 40, as discussed above. FIG. 14 shows the front of the vehicle 1 with the unit 10 opened and the bed support posts 32 installed.

FIG. 15 shows the box in perspective view and in isolation. As discussed above, the box has a box front support 28 that incorporates a rectangular frame, and a back support 29 that also has a rectangular frame, the bottom frame 30 and the top frame 31, both or which are rectangular frames. Two support bars 51 help support the front support 28 and the rear support 29 as shown.

FIG. 16 shows a cross section of the lower frame members. The main frame member is a piece of "C" channel 52. The "C" channel 52 is secured to the top surface of the middle section 12 of the unit 10. At the top of the "C" channel 52 are two square tubing stiffeners 53, which form the base 30. These stiffeners 53 keep the "C" channel 52 aligned during operation and provide a base for the hinges 70 for the box supports 28 and 29, as discussed below. Within the "C" channel 52 are two tracking members. The inner tracking member 54 carries the bed tracking member 55. The "C" channel 52 runs the length of the middle unit 12. This way, the bed frame 25 can slide back into the unit 10 for storage. When the expandable bed frame 25 is fully extended, the front end of the "C" channel ends at points A on FIG. 9. Here, the inner tracking member 54 is blocked from further movement. This ensures that the bed frame 25 cannot be pulled completely out of the unit 10. The points A are also important because the bed frame 25 must clear the "C" channel 52 at these points. Otherwise, the side extensions 41 cannot be pulled out. The box front support 28 and the box back support 29 ride on top of member 30. Locking hinges 70 are provided at each corner as shown in FIG. 19. These hinges 70 are designed to lock the box front support 28 and the box back support 29 in an upright position for use as shown in FIG. 19. The arrows in FIG. 19 show the direction of movement for the box front support 28 and the box back support 29 when the front box support 28 and the back box support 29 are being stored.

Referring now to FIGS. 17 and 18, details of the bed support posts 32 and the bed support brackets 35 are shown. The bed support brackets 35 are secured to the hood area 80 of the vehicle using bolts, screws, or other fasteners known in the art. The bed support brackets 35 have a hole 37 to receive a pin 36. The bed support posts 32 are secured to the bed support brackets 35 using pins 36 as shown in FIG. 18.

Referring now to FIGS. 19–21, an option for the unit 10 is shown. Two pairs of side bars 60 can then be deployed. These bars 60 are connected by a length of stretched cable 61 to create storage areas, or bunks in the side walls of the upper unit 20. The side bars 60 are hinged using locking hinges 70 (or their equivalents), to fold out from the unit 10. See FIG. 20. Alternatively, the side bars 60 can be pinned in place without using hinges. The side bar units 60 are attached to the "C" channel 52. FIG. 20 shows the side bar units 60 deployed at the first stage. A pair of telescoping inserts 65 can be provided to extend out the length of the side walls as shown in FIG. 21. Thus, the side units 60 can be opened to stage one, and used for storage as desired. If needed or desired, the telescoping inserts 65 can be extended to provide additional space for storage within the vehicle or can be used as an overhang like an awning. The side wall units 60 can be installed on either side of the unit 10 or can be installed on both sides of the unit 10, if desired. In the preferred embodiment, two pairs of side wall units 60 are used, one on each side of the unit.

FIG. 22 shows the rear of the truck unit 10 with a full size hatch back type door 15. To accommodate the door, side windows 91 are included as shown. The hatchback 15 can also have a window 92, if desired.

The hatchback door 15 swings up on hinges 90 or by similar means known to the art. All other features of this embodiment are identical to that of FIG. 7.

FIGS. 23a and 23b show details of the hinges 70. The figures show one hinge 70, but all hinges 70 are identical in operation. FIG. 23a shows the hinge 70 for the front box support 28. The front box support 28 is shown here in the collapsed position. The hinge 70 has two holes 75 as shown to receive a spring loaded pin 76. In the collapsed position, the pin 76 is in the lower position as shown. To raise the front box support 28, the pin 76 is pushed into the hinge 70 until the pin 76 clears the hole 75. The front box support 28 can then be pushed upward until it is vertical as shown in FIG. 23b. At this point, the pin 76 becomes aligned with the upper hole 75 and the pin 76 is then pushed out into the hole 75 by the spring (not shown). In this manner, the front box support 28 is now locked in the vertical position. All other hinge operations discussed above are identical to this operation. Moreover, other hinges may be used provided that have the same locking abilities as those described.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A camper unit for a vehicle comprising:

a) a camper shell body, having an open top, side walls and a rear door;

b) a lower frame unit, having a front, a back and a top, fixedly attached to the open top of said camper shell body;

c) an upper expandable frame unit, hingably attached to the top of said lower frame unit;

d) a bed portion, slidably attached to said lower frame unit, said bed portion including i) a inner frame, having a top, bottom, a front, a back, two sides, said inner frame being formed of tubing members having hollow interior portions, ii) a first side member, having two ends, said two ends being open, and being slidably attached to said inner frame and engaging said tubing members so that said first side member may be extended from said inner frame, and further such that said first side member may be contracted against said inner frame by sliding into said hollow interior portions of said tubing members, and iii) a second side member, having two ends, said two ends being open, and being slidably attached to said inner frame and engaging said tubing members so that said second side member may be extended from said inner frame, and further such that said second side member may be contracted against said inner frame by sliding into said hollow interior portions of said tubing members;

e) means for supporting said bed portion when said bed portion is deployed;

f) means for upwardly extending said upper expandable frame unit; and g) means for securing said upper expandable frame unit in an expanded position, thereby creating a living area within said camper shell body.

2. The camper unit of claim 1 wherein said bed portion further comprises a head member, said head member being formed of tubing members having hollow interior portions, said head member being slidably attached to the front of said inner frame so that the head member may be extended from said inner frame for use and such that said head member may be contracted against the inner frame by sliding into said hollow interior portions of said tubing members of said inner frame.

3. The camper unit of claim 2 wherein the head member further comprises:

a) a first wing member, slidably attached to said head member so that said first wing member may be extended or contracted against said head member by slidably engaging said hollow interior portions of said tubing members of said head member; and b) a second wing member, slidably attached to said head member so that said second wing member may be extended or contracted against said head member by slidably engaging said hollow interior portions of said tubing members of said head member.

4. The camper unit of claim 1 wherein said upper expandable frame unit is covered with a waterproof fabric.

5. The camper unit of claim 1 wherein the means for supporting said bed portion when said bed portion is deployed comprises at least one support post removably attached to said bed portion and said vehicle.

6. The camper unit of claim 1 wherein the means for upwardly extending said upper expandable frame unit comprise a plurality of rigid members, pivotably attached to said lower frame unit.

7. The camper unit of claim 1 wherein the means for securing said upper expandable frame unit in an expanded position, thereby creating a living area within said camper shell body comprise a plurality of locking hinges attached to said upper expandable frame unit.

8. The camper unit of claim 1 further comprising at least one side shelf unit, expandably attached to said lower frame unit.

9. The camper unit of claim 8 wherein said side shelf unit comprises;

a) a first end member, hingably attached to said lower frame unit such that said first end member can be extended to an outward position that is perpendicular to said lower frame unit, and can be collapsed to a position parallel to said lower frame unit;

b) a second end member, hingably attached to said lower frame unit such that said second end member can be extended to an outward position that is perpendicular to said lower frame unit, and can be collapsed to a position parallel to said lower frame unit, said second end member being oppositely disposed to said first end member and being positioned at some distance therefrom; and c) a length of flexible cable, being fixedly attached to said first end member and said second end member such that when said first and second end members are extended, the length of flexible cable is stretched tightly between said first and second end members, thereby forming a beam support between said first and second end members.

10. The camper unit of claim 9 further comprising a first telescoping extension, slidably placed within said first end member; a second telescoping extension, slidably placed within said second end member; whereby said length of flexible cable is fixedly attached to said first and second extension members such that when said first and second extension members are extended said length of cable is extended.

11. A camper unit for a vehicle comprising:

a) a camper shell body, having an open top, side walls and a rear door;

b) a lower frame unit, having a front, a back and a top, fixedly attached to the open top of said camper shell body;

c) an upper expandable frame unit, hingably attached to the top of said lower frame unit, wherein said upper expandable frame unit is covered with a waterproof fabric, wherein said upper expandable frame unit includes a plurality of rigid members, pivotably attached to said lower frame unit;

d) a bed portion, slidably attached to said lower frame unit, said bed portion including i) a inner frame, having a top, bottom, a front, a back, two sides, said inner frame being formed of tubing members having hollow interior portions, ii) a first side member, having two ends, said two ends being open, and being slidably attached to said inner frame and engaging said tubing members so that said first side member may be extended from said inner frame, and further such that said first side member may be contracted against said inner frame by sliding into said hollow interior portions of said tubing members, and iii) a second side member, having two ends, said two ends being open, and being slidably attached to said inner frame and engaging said tubing members so that said second side member may be extended from said inner frame, and further such that said second side member may be contracted against said inner frame by sliding into said hollow interior portions of said tubing members;

e) at least one support post, removably attached to said bed portion;

f) a means for removably attaching said support post to said vehicle; and g) a means for locking said plurality of rigid members in a vertical configuration, thereby creating a living space within said camper unit.

12. The camper unit of claim 11 wherein said means for locking said plurality of rigid members comprise a plurality of locking hinges attached to said upper expandable frame unit.

13. The camper unit of claim 11 wherein said bed portion further comprises a head member, said head member being formed of tubing members having hollow interior portions, said head member being slidably attached to the front of said inner frame so that the head member may be extended from said inner frame for use and such that said head member may be contracted against the inner frame by sliding into said hollow interior portions of said tubing members of said inner frame.

14. The camper unit of claim 13 wherein the head member further comprises:

a) a first wing member, slidably attached to said head member so that said first wing member may be extended or contracted against said head member by slidably engaging said hollow interior portions of said tubing members of said head member; and b) a second wing member, slidably attached to said head member so that said second wing member may be extended or contracted against said head member by slidably engaging said hollow interior portions of said tubing members of said head member.

15. The camper unit of claim 11 further comprising at least one side shelf unit, expandably attached to said lower frame unit.

16. The camper unit of claim 15 wherein said side shelf unit comprises:

a) a first end member, hingably attached to said lower frame unit such that said first end member can be extended to an outward position that is perpendicular to said lower frame unit, and can be collapsed to a position parallel to said lower frame unit;

b) a second end member, hingably attached to said lower frame unit such that said second end member can be extended to an outward position that is perpendicular to said lower frame unit, and can be collapsed to a position parallel to said lower frame unit, said second end member being oppositely disposed to said first end member and being position at some distance therefrom; and c) a length of flexible cable, being fixedly attached to said first end member and said second end member such that when said first and second end members are extended, said length of flexible cable is stretched tightly between said first and second end members, thereby forming a beam support between said first and second end members.

17. The camper unit of claim 16 further comprising a first telescoping extension, slidably placed within said first end member; a second telescoping extension, slidably placed within said second end member; whereby said length of flexible cable is fixedly attached to said first and second extension members such that when said first and second extension members are extended said length of cable is extended.

18. A camper unit for a vehicle comprising:

a) a camper shell body, having an open top, side walls and a rear door;

b) a lower frame unit, having a front, a back and a top, fixedly attached to the open top of said camper shell body;

c) an upper expandable frame unit, hingably attached to the top of said lower frame unit, wherein said upper expandable frame unit is covered with a waterproof fabric, wherein said upper expandable frame unit includes a plurality of rigid members, pivotably attached to said lower frame unit;

d) a bed portion, slidably attached to said lower frame unit, said bed portion including i) a inner frame, having a top, bottom, a front, a back, two sides, said inner frame being formed of tubing members having hollow interior portions, ii) a first side member, having two ends, said two ends being open, and being slidably attached to said inner frame and engaging said tubing members so that said first side member may be extended from said inner frame, and further such that said first side member may be contracted against said inner frame by sliding into said hollow interior portions of said tubing members, and iii) a second side member, having two ends, said two ends being open, and being slidably attached to said inner frame and engaging said tubing members so that said second side member may be extended from said inner frame, and further such that said second side member may be contracted against said inner frame by sliding into said hollow interior portions of said tubing members;

e) a head member, said head member being formed of tubing members having hollow interior portions, said head member being slidably attached to the front of said inner frame so that the head member may be extended from said inner frame for use and such that said head member may be contracted against the inner frame by sliding into said hollow interior portions of said tubing members of said inner frame, said head member further including, i) a first wing member, slidably attached to said head member so that said first wing member may be extended or contracted against said head member by slidably engaging said hollow interior portions of said tubing members of said head member, and ii) a second wing member, slidably attached to said head member so that said second wing member may be extended or contracted against said head member by slidably engaging said hollow interior portions of said tubing members of said head member;

f) at least one support post, removably attached to said bed portion;

g) a means for removably attaching said support post to said vehicle; and h) a plurality of locking hinges, hingably attached to said plurality of rigid members, and said upper expandable frame unit, such that said plurality of locking hinges allow said plurality of rigid members to pivot from a horizontal position for storage, into a vertical position for use and further such that when said plurality of rigid members are in a horizontal position and when said plurality of rigid members are in a vertical position, said plurality of rigid members are locked in place.

19. The camper unit of claim 18 further comprising at least one side shelf unit, expandably attached to said lower frame unit, said side shelf unit comprising a) a first end member, hingably attached to said lower frame unit such that said first end member can be extended to an outward position that is perpendicular to said lower frame unit, and can be collapsed to a position parallel to said lower frame unit;

b) a second end member, hingably attached to said lower frame unit such that said second end member can be extended to an outward position that is perpendicular to said lower frame unit, and can be collapsed to a position parallel to said lower frame unit, said second end member being oppositely disposed to said first end member and being position at some distance therefrom; and c) a length of flexible cable, being fixedly attached to said first end member and said second end member such that when said first and second end members are extended, said length of flexible cable is stretched tightly between said first and second end members, thereby forming a beam support between said first and second end members.

20. The camper unit of claim 19 further comprising a first telescoping extension, slidably placed within said first end member; a second telescoping extension, slidably placed within said second end member; whereby said length of flexible cable is fixedly attached to said first and second extension members such that when said first and second extension members are extended said length of cable is extended.

* * * * *